UNITED STATES PATENT OFFICE.

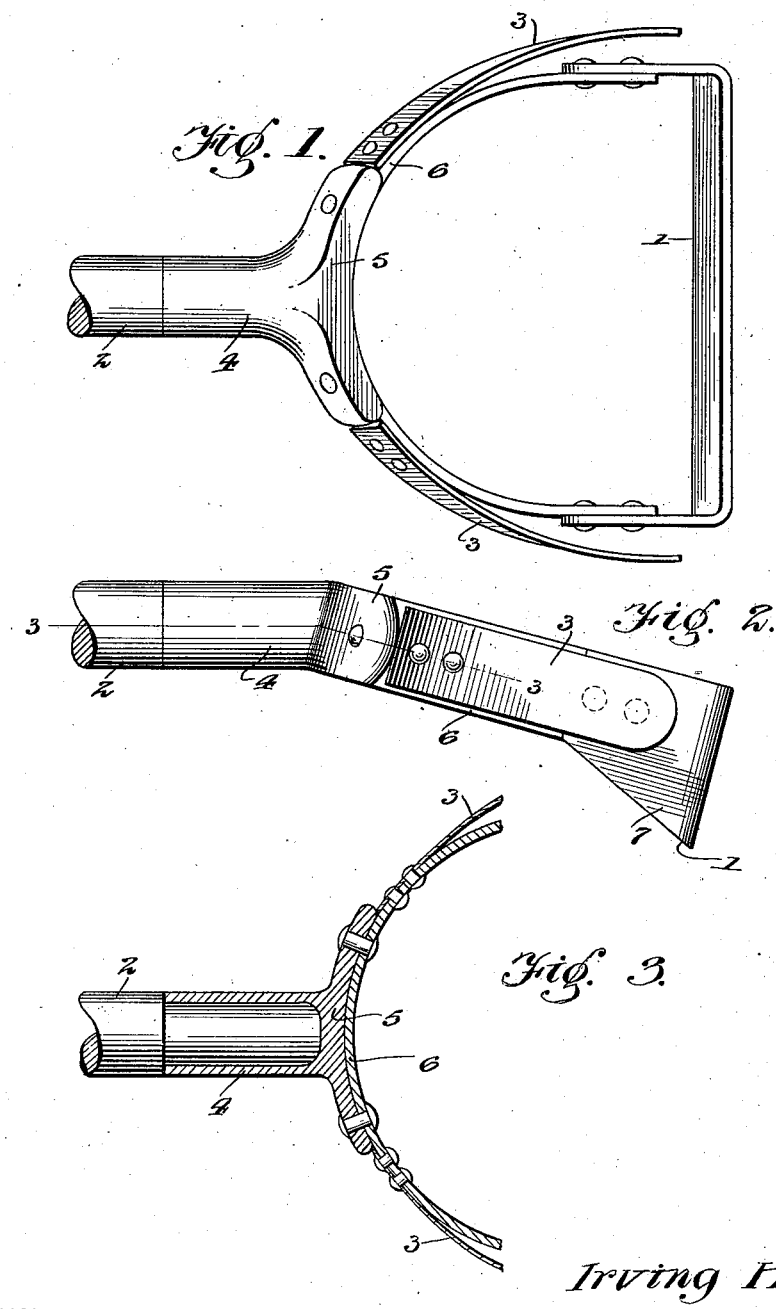

IRVING HILLS, OF DEERFIELD, NEW YORK.

COMBINED HOE, WEEDER, AND PLANT-PROTECTOR.

1,132,344.      Specification of Letters Patent.      Patented Mar. 16, 1915.

Application filed July 3, 1914. Serial No. 848,860.

*To all whom it may concern:*

Be it known that I, IRVING HILLS, a citizen of the United States, residing at Deerfield, in the county of Oneida and State of New York, have invented new and useful Improvements in Combined Hoes, Weeders, and Plant-Protectors, of which the following is a specification.

The present invention has for its object the provision of an implement which may be used in the capacity of a hoe, weeder and like hand device and which will protect plants and prevent injury thereto when cultivating the same.

The invention consists of a hand implement embodying a blade, a handle and protecting means for preventing injury to plants, the novelty residing in the peculiar formation of the device and the arrangement of the several parts.

The invention consists of the novel features, details of construction and combination of parts, which hereinafter will be more particularly set forth, illustrated and claimed.

In the drawings hereto attached: Figure 1 is a top plan view of an implement embodying the invention. Fig. 2 is a side view. Fig. 3 is a detail view.

Corresponding and like parts are referred to in the following description, and indicated in all the views of the drawings, by the same reference characters.

The device comprises a blade 1, handle 2, intermediate connecting means between the blade and handle, and plant protector 3. A shank 4 is fitted to the handle 2 and as shown is in the form of the socket. A cross head or flange 5 is formed at the outer end of the shank 4 and receives a bail 6 which is secured thereto in any manner. The blade 1 has bent ends 7 which are riveted or otherwise fastened to the ends of the bail 6, the ends 7 forming a part of the blank from which the blade 1 is formed. The bail 6 consists of a strip of metal bent into the form of a bow and attached at a middle point to the cross head or flange 5. One edge of each of the end pieces 7 is inclined thereby throwing the blade 1 at an angle to the plane of the bail and handle so that when the implement is in use the blade 1 is inclined to the surface thereby enabling it to cut into the soil so as to remove weeds and cultivate the plants.

The plant protecting means 3 consists of blades which are secured at one end to the bail 6 and have the opposite end 3 spaced from the bent ends 7. The blades 3 may possess a spring action so as to yield and thereby enable the device to work close to the roots of the plants, while at the same time avoiding injury to the latter. The implement is used by a drawing or pulling action, thereby avoiding injury to plants since the opposite inclined arrangement of the protectors 3 will enable the latter to ride over the plants without injuring the same.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. A device of the character set forth, comprising a handle, a bail connected to the handle, a blade attached to the bail and protectors secured at one of their ends to the bail and having their opposite ends extending along the ends of the blade and spaced therefrom.

2. An implement of the character described comprising a handle, a bail connected with the handle, a blade having bent ends, the latter having corresponding edges inclined, said blade being secured by means of its bent edges to the bail, and protectors attached at their inner ends to the bail and having their outer ends extending along the ends of the blade and spaced therefrom.

In testimony whereof I affix my signature in presence of two witnesses.

IRVING HILLS.

Witnesses:
  HIRAM CONE,
  JUSTIN A. AUERT.

Copies of this patent may be obtained for five cents each, by addressing the "Commissioner of Patents, Washington, D. C."